(Model.)
T. W. LIVINGSTON.
Magneto Electric Machine.
No. 229,719.  Patented July 6, 1880.
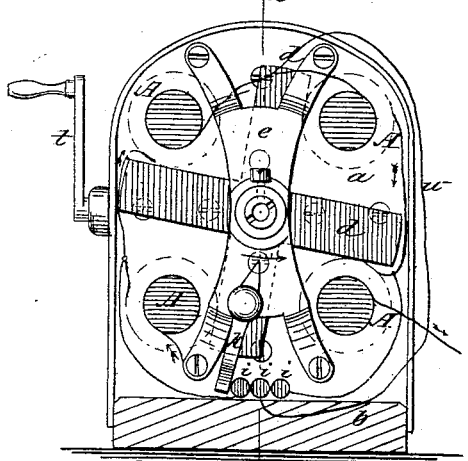
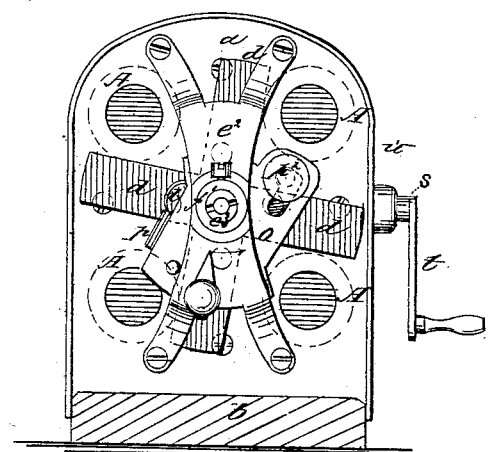
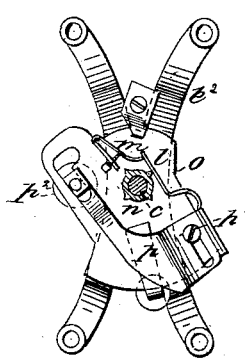
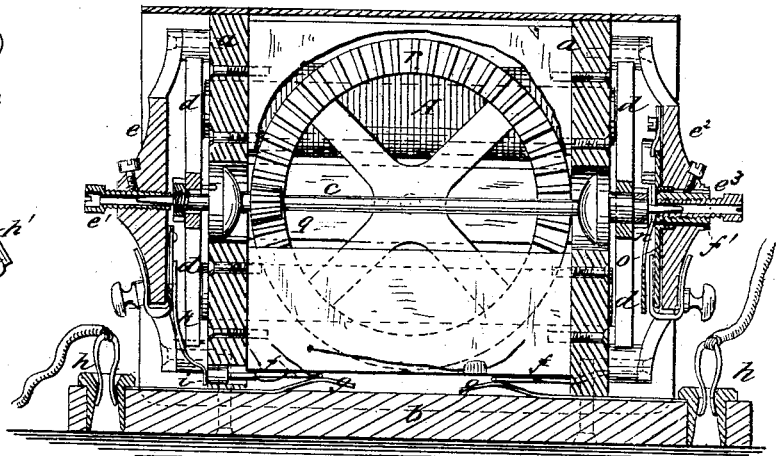
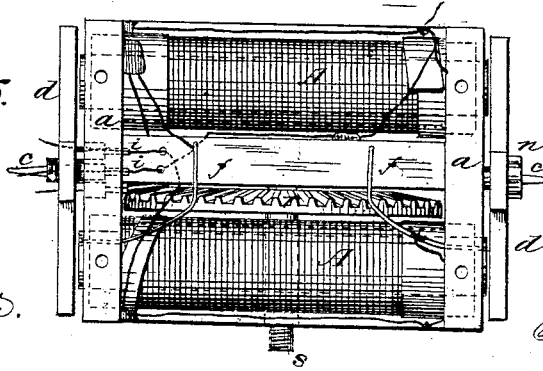
WITNESSES:
INVENTOR:
T. W. Livingston
BY Munn & Co
ATTORNEYS.

UNITED STATES PATENT OFFICE.

THOMAS W. LIVINGSTON, OF AINSWORTH, IOWA.

MAGNETO-ELECTRIC MACHINE.

SPECIFICATION forming part of Letters Patent No. 229,719, dated July 6, 1880.

Application filed March 12, 1880. (Model.)

*To all whom it may concern:*

Be it known that I, THOMAS W. LIVINGSTON, of Ainsworth, in the county of Washington and State of Iowa, have invented a new and useful Improvement in Magneto-Electric Machines, of which the following is a specification.

The curative properties of an electric current may be adapted to the treatment of different diseases by taking advantage of its different qualities as developed under varying conditions. The current may have great intensity and little quantity, or it may have great quantity and little intensity. It may be continuous or intermittent, or it may be made to alternate, so that electrical impulses of different name will rapidly succeed each other.

There are two methods of generating electrical currents for curative purposes—one by chemical means, as in the various forms of battery, the other by the direct conversion of mechanical energy into electrical energy, as in the magneto-electric machine.

Magneto-electric machines have not generally been considered as efficient for curative purposes as batteries, on account of the difficulty experienced in constructing a machine capable of yielding the different qualities of current required for the treatment of different subjects.

The object of my invention is to provide a magneto-electric machine capable of yielding currents varying in their character, so that its range of application will be wider than that of batteries, while it is more compact, more manageable, more easily adjusted and operated by either skilled or unskilled persons.

To produce the current I make use of two armatures fitted to a common shaft and arranged to revolve simultaneously across the opposite ends of a series of permanent bar-magnets, the magnets being surrounded by helices in which the currents are induced; and the invention consists in the combination of these elements in a compact, durable, and efficient machine, and in novel devices for regulating and modifying the currents, so as to produce the desired effects.

In the drawings, Figure 1 is an end view of the machine looking at one pole of the magnets. Fig. 2 is a similar view of the reverse end. Fig. 3 is a vertical longitudinal section on line $x\,x$ in Fig. 1. Fig. 4 is a detail view of the commutator, and Fig. 5 is an inverted plan view of the machine with the base removed.

Similar letters of reference indicate corresponding parts.

Four permanent bar-magnets, A, are supported at their ends by heads $a$, of insulating material, and each magnet is wound throughout its entire length and as close to its end as possible with insulated wire, the heads $a$ being counterbored to allow the coil to extend nearly through them.

The heads $a$ are rigidly fastened to blocks or braces placed between the magnets. They are also secured to the base $b$, which, together with a case, $u$, insures rigidity and keeps the magnets in position, so that their armatures may revolve very near them without touching them. The poles of the magnets alternate in position, so that at each end of the machine the poles are alternately north and south.

The armatures $d$ are radial, each having four arms, corresponding to the number of magnets. They are secured to opposite ends of the shaft $c$, which extends through the heads, parallel to and equally distant from the magnets. The ends of the shaft $c$ extend beyond the armatures, and are supported by tubular conical adjustable bearings $e'$ in the spiders $e\ e^2$.

The bearings $e'$ are made tubular to admit oil to the journals, and they are made conical and adjustable to admit of taking up the wear, so that the shaft may always be kept in line and the armatures may be kept in position to revolve freely without striking the ends of the magnets.

The wires of the helices are connected together in series, the terminal wires connecting with the wires $f\,f$, so that the circuit is complete when these terminals are connected. The wires $f\,f$ extend through the heads $a$ and connect with the spiders $e\ e^2$. The wires, being of spring metal, spring against the spiders $e\ e^2$, insuring a good contact. This arrangement permits of removing and replacing the spiders with certainty of re-establishing a connection between the spiders and the helices.

Connection is made between the terminals $f$ and the binding-posts $h$ by springs $g$, so that the base $b$ can be removed and replaced with certainty of re-establishing connection between the helices and the binding-posts. Three of the helices are connected with three insulated pins, $i$, in one of the heads $a$, and one or more of these three helices may be short-circuited when the arm $k$, which is pivoted to the spider $e$, is moved so as to touch the first, second, or third of the pins $i$.

On the spider $e^2$ at the opposite end of the machine there is a plate, $o$, supported by a short sleeve projecting from one of its sides, and entering an annular space in the spider $e^2$, surrounding the inner end of the insulated bearing of shaft, so that it may vibrate in a plane parallel to that of the revolution of the shaft $c$, carrying with it the spring $l$, which rests against the adjustable arm $m$. This arm $m$ may be adjusted so that the spring $l$ will touch one of the four projections of the serrated wheel $n$, while the shaft $c$ makes less than one-fourth of a revolution. The period of contact is varied by sliding the arm $p$, which supports the spring $l$, and is clamped in any desired position by the binding-screw $p^2$, working through a slot in the plate $o$. This slot has at one end a notch which admits of swinging the arm $p$ so as to throw the spring $l$ out of contact with the wheel $n$ and arm $m$.

The shaft $c$ is in electrical communication with the spider $e$, but is insulated from the spider $e^2$ by a sleeve, $f'$, of rubber, around the bearing $e^3$, so that a short circuit is formed between the terminals $f$ when the projections of the wheel $n$ touch the spring $l$. When the shaft $c$ is revolved the wheel $n$ and spring $l$ close and break contact four times in one revolution. At each break of contact the current is suddenly changed from the short circuit through the shaft $c$ to the electrodes connected with the binding-posts $h$, producing an electrical shock varying in intensity, according to the relative position of the armatures $d$ and the magnets A, when the contact is broken in the manner described. The strongest shock is produced when the contact between the spring $l$ and wheel $n$ is broken as the arms of the armatures are just leaving the magnets, and is weaker as the contact is broken at an earlier or later period in the revolution of the armature, within certain limits in either direction.

The plate $o$ is made movable for the purpose of varying the intensity of the shock by changing the time of contact between the spring $l$ and wheel $n$, and the spring $l$ may be moved by sliding the arm $p$ so as to vary the length of contact between it and the wheel $n$, and this may be done without altering the time of breaking contact, which is done only by moving the plate $o$. It will be seen that this construction admits of the movement of the plate $o$ in one direction or the other, to vary the intensity of the shock without materially affecting the quantity of the current. It will also be seen that by moving the arm $p$ in the manner specified the quantity of the current may be regulated without materially affecting the intensity of the shock.

When the spring $l$ is moved so as not to touch the wheel $n$ the currents proceed directly from the helices to the electrodes without modification. These currents are of alternating polarity, increasing and decreasing gradually in intensity without sudden interruption, and are well adapted to peculiar cases.

The shaft $c$ is fitted with a bevel-pinion, $q$, meshing with a bevel-gear wheel, $r$, carried by an arbor, $s$, which is journaled in one of the braces between the heads $a$. The arbor is provided with a handle, $t$, by which the apparatus may be revolved.

A case, $u$, protects the helices and assists in firmly holding the heads $a$.

I do not limit or confine myself to the particular construction herein described, as the form, size, and proportion of the various parts may be changed without altering the essential features of my invention.

From the spider $e$ the current passes through each coil of the series in succession, finally reaching the other spider, $e^2$. The first of the pins $i$ is connected with the first helix at the end or pole opposite to the one that is connected to the spider $e$. Now, if the arm $k$, which is attached to this spider, is moved so as to touch this first pin, the first helix will have a short circuit through the arm $k$ and spider $e$. In the same way this helix and the next of the series is short-circuited by moving the arm $k$ so as to touch the second pin, and these two with the third when the arm $k$ touches the third pin.

Having thus fully described my invention, I claim as new and desire to secure by Letters Patent—

1. In magneto-electric machines, the combination of the magnets A, insulating-heads $a$, armatures $d$, shaft $c$, and spiders $e\,e^2$, substantially as herein shown and described.

2. The combination, with the magnets A, of the spider $e$, pins $i$, and adjustable arm $k$, as and for the purpose specified.

3. In magneto-electric machines, the combination of the adjustable arm $p$, spring $l$, and the serrated wheel $n$, substantially as and for the purpose specified.

4. In magneto-electric machines, the plate $o$, adjustable on the spider $e^2$, and carrying the circuit-closing spring $l$, in combination with the serrated wheel $n$, substantially as specified.

5. In magneto-electric machines, the combination of the adjustable arm $m$ with the circuit-closing spring $l$, substantially as specified.

6. In a magneto-electric machine, the combination of the slotted swinging plate $o$, slotted arm $p$, spring $l$, and wheel $n$, substantially as herein shown and described.

THOMAS W. LIVINGSTON.

Witnesses:
FRED. L. REED,
WILL R. BENSON.